US006646413B2

United States Patent
Autenrieth et al.

(10) Patent No.: US 6,646,413 B2
(45) Date of Patent: Nov. 11, 2003

(54) FUEL CELL SYSTEM AND METHOD FOR OPERATING THE FUEL CELL SYSTEM

(75) Inventors: Rainer Autenrieth, Grossbottwar (DE); Gerhard Konrad, Ulm (DE); Karsten Ledwig, Waldsolms (DE); Michael Niehues, Ulm (DE); Markus Walter, Metzingen (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/987,444

(22) Filed: Nov. 14, 2001

(65) Prior Publication Data
US 2002/0057066 A1 May 16, 2002

(30) Foreign Application Priority Data

Nov. 14, 2000 (DE) .......................................... 100 56 429

(51) Int. Cl.[7] .......................... H01M 10/44; H01M 8/12
(52) U.S. Cl. .......................................... 320/101; 429/25
(58) Field of Search .......................... 320/101; 429/13, 429/23, 22, 25; 361/78, 87, 93.1, 18; 180/65.1, 65.3

(56) References Cited

U.S. PATENT DOCUMENTS

| 3,443,115 A | | 5/1969 | Timmerman et al. ......... 307/66 |
|---|---|---|---|
| 3,850,695 A | * | 11/1974 | Keller et al. .................. 429/23 |
| 3,879,218 A | * | 4/1975 | Kellen et al. ................. 429/22 |
| 4,098,959 A | * | 7/1978 | Fanciullo ....................... 429/25 |
| 4,839,574 A | * | 6/1989 | Takabayashi ................ 320/101 |
| 5,156,928 A | * | 10/1992 | Takabayashi ................. 429/23 |
| 5,330,857 A | * | 7/1994 | Sederquist et al. ........... 429/13 |
| 5,519,312 A | * | 5/1996 | Wang et al. ................... 429/23 |
| 5,780,981 A | * | 7/1998 | Sonntag et al. ............. 318/139 |
| 6,011,324 A | * | 1/2000 | Kohlstruck et al. ........... 307/64 |
| 6,210,822 B1 | * | 4/2001 | Abersfelder et al. .......... 429/19 |
| 6,255,008 B1 | * | 7/2001 | Iwase ............................ 429/9 |
| 6,387,556 B1 | * | 5/2002 | Fuglevand et al. ........... 429/22 |
| 6,428,918 B1 | * | 8/2002 | Fuglevand et al. ........... 429/13 |

FOREIGN PATENT DOCUMENTS

| DE | 195 40 824 | 11/1995 |
|---|---|---|
| DE | 19703171 | 8/1998 |
| DE | 19932781 | 12/1999 |
| DE | 19523109 | 10/2001 |
| EP | 0136187 | 4/1985 |

OTHER PUBLICATIONS

German Search Report.

* cited by examiner

Primary Examiner—Pia Tibbits
(74) Attorney, Agent, or Firm—Crowell & Moring LLP

(57) ABSTRACT

A fuel cell system includes a fuel cell unit having an anode side and a cathode side, anode-side feeding and outflow lines for the supply of fuel and removal of anode-side exhaust, and cathode-side feeding and outflow lines for the supply of oxygen and removal of cathode-side exhaust. The fuel cell system also includes means for electrically switching the fuel cell unit on and off depending on the available quantity of fuel.

17 Claims, 1 Drawing Sheet

FUEL CELL SYSTEM AND METHOD FOR OPERATING THE FUEL CELL SYSTEM

This application claims the priority of German patent document 100 56 429.1, filed Nov. 14, 2000, the disclosure of which is expressly incorporated by reference herein.

BACKGROUND AND SUMMARY OF INVENTION

The present invention relates to a fuel cell system and a method for operating the fuel cell system.

In conventional fuel cell systems, for example in fuel cell vehicles, the hydrogen and oxygen quantities that are supplied to the fuel cell are adapted to the desired fuel cell output by adjusting the hydrogen and oxygen quantities using suitable control or regulating methods. Such a fuel cell system is known in the art from DE 195 40 824 A1 (U.S. Pat. No. 5,780,981).

It is the subject-matter of the present invention to describe a fuel cell system that features simplified controlling or regulating of the fuel cell system.

According to the present invention, a fuel cell unit is electrically switched off and on depending on the availability of resources.

The advantage is that for different load requirements that are placed upon the fuel cell unit no complex control of the resource supply is required. This is particularly advantageous for a fuel cell system with a reformer.

Naturally, the above-described characteristics, as well as the characteristics that will be described in more detail in the following, can be applied in the context of the indicated combination, but also for other types of combinations or separately without leaving the framework of the present invention.

Other objects, advantages and novel features of the present invention will become apparent from the following detailed description of the present invention when considered in conjunction with the accompanying drawings.

DETAILED DESCRIPTION OF THE DRAWINGS

According to the present invention, it is possible to control or regulate a fuel cell system with a reformer applying little effort. It is particularly beneficial for a battery to store energy supplied by the fuel cell system.

Figure 1:
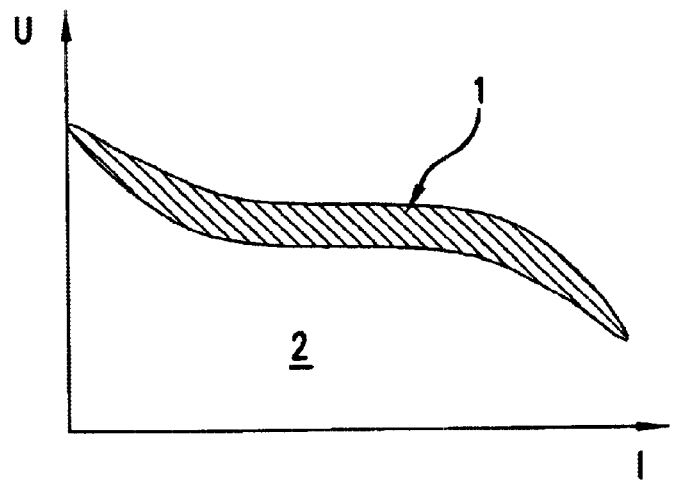
FIG. 1 shows a typical voltage-current characteristic field of a fuel cell.

FIG. 1 shows a voltage-current characteristic field of a fuel cell. The shaded area 1 between the upper and the lower voltage-current characteristics represents the allowable range 1 suitable for operating a fuel cell. A prohibited zone 2 is located outside the shaded area in which a fuel cell cannot be operated and/or, if the fuel cell or a fuel cell stack with a plurality of cells operated in this zone 2, the cells fail after a short period of time leading to the destruction of the cells. The course of any such typical voltage-current characteristics can be influenced only to a minimal extent in a prescribed fuel cell unit by varying the operating parameters, typically only by 5% to 10%.

Aside from the load impedance of the fuel cell unit, generally, the fuel, such as hydrogen, which is supplied to the fuel cell unit on the anode side, and oxygen, which is supplied on the cathode side, must be regulated.

Figure 2:
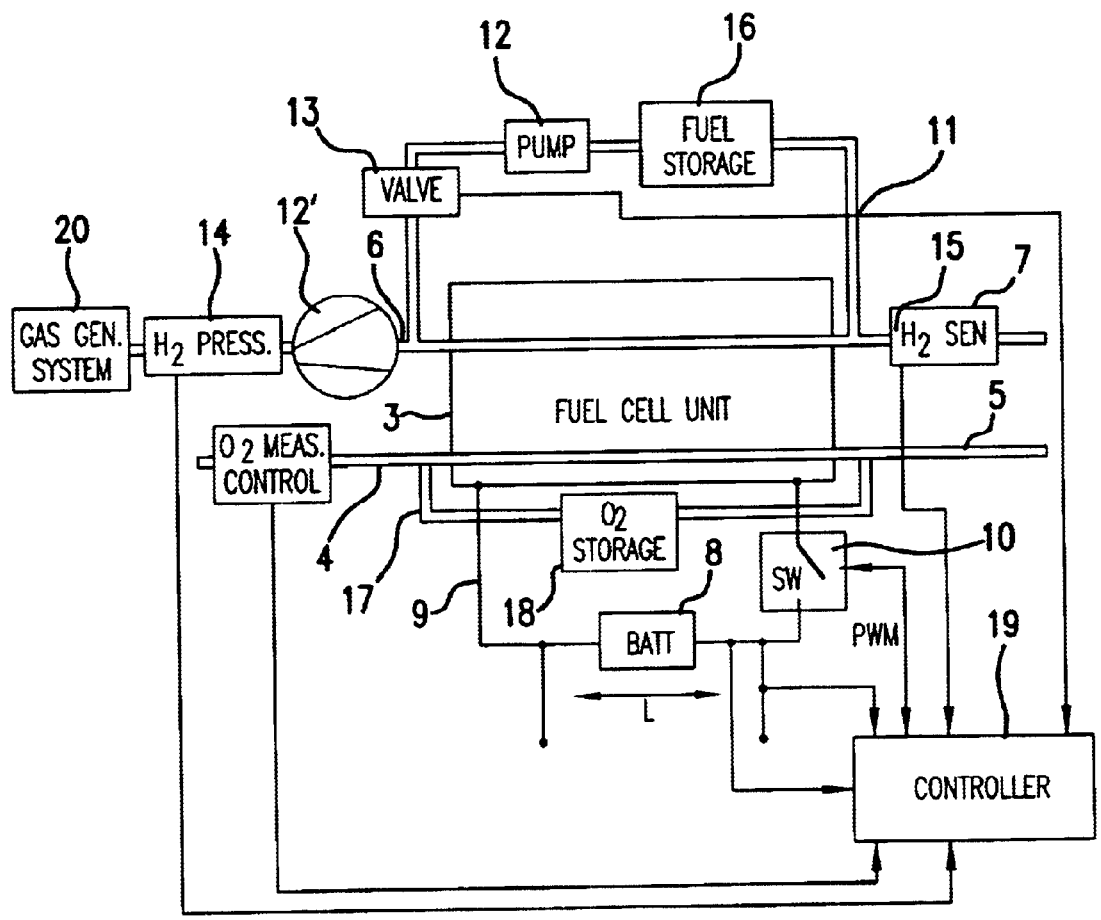
FIG. 2 shows a basic diagram of a preferred apparatus for implementing a method according to the present invention.

FIG. 2 represents a preferred apparatus according to the present invention. A fuel cell unit 3 is equipped with (1) a feeding line 4, located on the cathode side, for supplying an oxidizing medium, preferably oxygen, into the fuel cell unit 3; and (2) an outflow line 5, located on the cathode side, for transporting cathode-side exhaust away from the fuel cell unit 3. An anode-side feeding line 6 supplies fuel, preferably hydrogen, from a reformer 20 to the fuel cell unit 3 and an anode-side outflow line 7 transports anode-side exhaust away from the fuel cell unit 3. The fuel cell unit is equipped with a large number of individual fuel cells that can form electric circuits which are parallel and/or in series. An ion-conducting membrane (transporting, e.g., protons from anode to cathode) is arranged between the anode area and cathode area of the individual fuel cells. A battery 8 is connected parallel to the fuel cell unit 3. The electric output that is generated in the cell due to the electrochemical reaction can be made available to a load impedance L, such as an electric motor or other components requiring electric power. The load impedance L is connected through an electric circuit 9 with the fuel cell unit 3 and wired parallel to the fuel cell unit 3 and the battery 8. A switch 10 is included in the electric circuit 9.

Using the switch 10, the fuel cell unit 3 can be electrically switched on when the switch 10 is closed, or the fuel cell unit 3 can be switched off when the switch 10 is opened.

Preferably, the switch 10 is an electronic switch that is actuated by turning a control voltage on and off. It is most suitable to select a switch that locks up when no voltage is applied and that opens up when voltage is applied. The control voltage is preferably pulse-width modulated. The ratio of switch "open" (voltage pulse) to switch "closed" (no voltage), i.e. the distance between the switch-on pulses of the control voltage and the duration of the switch-on pulses, are characteristic. This ratio is determined by the presence or lack of sufficient burnable gas, preferably hydrogen. The switch-on criterion is "sufficient burnable gas available". The switch-off criterion is "too little burnable gas available". The ratio with regard to "on-conditions" and "off-conditions" can be influenced on the basis of currently available fuel quantities. If the fuel quantity increases, the length of switch-on is extended. If the fuel quantity decreases, the switch-on length is shortened. It is favorable that the frequency of the pulse-width modulated trigger signal can be selected in such a way that there are only minimal fluctuations in the supply of the fuel cells, thereby allowing for a continuous or quasi-continuous control.

The supply of fuel to the fuel cell unit 3 takes place on the anode side via a feeding line 6 from a reformer 20. The anode-side exhaust is removed from the fuel cell unit 3 via an outflow line 7. Further details regarding the fuel cell system, such as the fuel tank, exhaust cleaning, and the like are not shown.

The anode side of the fuel cell unit 3 is equipped with a line 11 that is capable of bridging the anode side of the fuel cell unit 3 and can be used as a recirculating line. A pump 12 can be placed in the recirculating line that circulates the fuel into the recirculating line 11. Pump 12' can also be a jet pump that is arranged most suitably in the anode feeding line 6. A valve 13 can also be placed in the recirculating line 11, which blocks or releases the recirculating line 11. In the alternative or in addition, it is also possible to envision an intermediate storage device 16 in which fuel can be temporarily stored.

A recirculating line 17 and/or an intermediate storage device 18 can also be envisioned for the oxidizing medium on the cathode side. If the fuel cell unit 3 is switched on only during certain times, then only a lower oxygen or air quantity is required. An appropriate smaller amount of air can be supplied, either by feeding an amount of air to the system and cycling it in a closed loop on the cathode side or by appropriately diminishing the amount of air or oxygen that is continuously fed to the cathode side.

Subsequently the present invention will be explained by way of the steps on the anode side of the fuel cell unit 3.

According to the present invention, the fuel cell unit 3 is electrically switched off if the load requirement for the fuel cell unit 3 requires more fuel, preferably hydrogen, than is available to the fuel cell unit 3 at the current time. To accomplish this the switch 10 is opened. While the fuel cell unit 3 is switched off, fuel and/or oxygen is continually supplied until a sufficient quantity of fuel and/or oxygen is available for the fuel cell unit 3 to be able to provide the required electric power. For this purpose, the fuel is circulated in the recirculating line 11 or directed to the intermediate storage device 16. This will increase the pressure of hydrogen on the anode side. Finally, the fuel concentration is high enough so that the fuel cell unit 3 can provide sufficient electric power. The switch 10 can now be closed again, causing the fuel cell unit 3 to be electrically switched on again.

Thus, the fuel cell unit 3 is electrically switched off and on depending on the available fuel quantity. In the switched off mode, fuel and/or oxygen is supplied to the fuel cell unit 3 until a sufficient quantity of fuel and/or oxygen is available to provide the power that is required of the fuel cell unit 3. The system dynamics are achieved primarily by switching the fuel cell unit 3 on and off.

The advantage is that the very expensive and complex controls for the hydrogen supply can be eliminated. Due to the capacitance characteristics of fuel cells, it is possible to achieve, for brief amounts of time, electric currents and electric output above the maximum fuel cell power. This results, for example, in higher starting torques in electric motors that are electrically supplied by the fuel cell unit 3.

Preferably, a jet pump is envisioned as pump 12 which circulates hydrogen and is driven by the inflowing hydrogen.

In a favorable embodiment, a pressure sensor 14 is in the anode-side feeding line 6, whereby the fuel cell unit 3 is switched on and/or off depending on the hydrogen pressure. It is also possible to effect the switching on and/or off action of the fuel cell unit 3 dependent on the hydrogen quantity in the outflow of the fuel cell unit 3. A measuring device 15 can be envisioned that measures the hydrogen content or the hydrogen flow in the outflow of the fuel cell unit 3. A corresponding signal is sent to control unit 19 which switches the fuel cell unit 3 off or on based on the current load requirement and the available fuel.

Preferably, the oxygen supply to the fuel cell unit 3 is adjusted depending on the on-position of the fuel cell unit 3. It is advantageous to use the same control information for adjusting the oxygen supply to the fuel cell unit 3 as for the triggering of the fuel cell unit 3, such as, for example, the hydrogen pressure in the anode feeding line 6 or the hydrogen content in the anode outflow 7. Supply in the off-position of the fuel cell unit 3 can occur by circulating oxygen or air in the cathode-side recirculating line 17 or by reducing the supply while, however, continually maintaining the supply.

The method according to the present invention and the fuel cell system are particularly advantageous if combined with a battery 8 that is charged by the fuel cell unit 3, for example, in a fuel cell vehicle. The fuel cell unit 3 can be connected directly with the battery 8. When dropping below a minimum charging current (i.e., when the battery 8 is fully charged) the fuel cell unit 3 can preferably be switched off and/or the fuel and/or oxygen supply to the fuel cell unit 3 be discontinued. Any possibly available electric motor for the vehicle drive or auxiliary aggregates and/or onboard power supply of a fuel cell vehicle can then be fed by the battery 8.

As a so-called APU (auxiliary power unit), the fuel cell system according to the present invention is suitable not only for supplying users of electric power in an onboard system, but also for supplying driving motors.

If an onboard system requires, for example, 1 kW power from the energy supply that consists of the fuel cell system and battery 8, the fuel cell system alone is able to fulfill this power requirement. If the need for power subsequently sharply increases, for example to 2 kW, the battery 8 and the fuel cell unit 3 are able to respond quickly, but not the gas generation system and/or the reformer 20 of the fuel cell system. According to the current/voltage characteristics of the fuel cell, with increased power the voltage of the fuel cell drops. A portion of the higher power demand can be provided by the fuel cell (e.g. 1.5 kW) and the remaining 0.5 kW can additionally be supplied by the battery 8. However, since the re-supply of hydrogen from the reformer 20 to the fuel cell unit 3 is not sufficient, and the fuel cell unit 3 is consuming too much hydrogen, the pressure on the hydrogen side of the fuel cell unit 3 drops. Once the pressure drops below a certain value, the fuel cell unit 3 is electrically switched off, after which point all power is taken from the battery 8. However, the reformer continues to supply hydrogen causing the pressure to increase again on the anode side. When a desired hydrogen pressure value has been reached, the fuel cell unit 3 can be electrically switched on again.

If a sudden increase in the load requirement occurs, at least part of the demand for electric power is provided by the battery 8 that is electrically connected with the fuel cell unit 3. The fuel cell unit 3 supplies electric power until the available quantity of fuel drops below a specified first threshold value. At that time, the fuel cell unit 3 is electrically switched off and the battery 8 supplies all required power, while at least the fuel supply to the fuel cell unit 3 continues to be maintained. This takes place until a second, upper threshold value of the available fuel quantity is reached; preferably, this value is high enough that the fuel cell unit 3 provides more electric power than was demanded by the electric users L. The excess power is used for charging the battery 8. The charging state of the battery 8 is preferably recorded by a charge state sensor and/or the charging current is observed.

This process repeats itself periodically. During this time, the reformer is readjusted and after a certain amount of time it reaches an output corresponding to an electric power of the fuel cell unit 3 of, for example, 2.2 kW (i.e., the power is higher than the actual load requirement of, for example, 2 kW). This will allow to supply the onboard system as well as recharge the battery 8, thereby compensating for previously drawn energy. With the increased charge state of the battery 8, the output of the fuel cell unit 3 and reformer is reduced to the actual load requirement by the users of, for example, 2 kW.

Since only few sensors and controls are required, considerable savings are possible with the fuel cell system according to the present invention.

With the triggering of the fuel cell unit 3 according to the present invention by way of the switch 10, it is possible to reach, averaged over time, operating points that lie within the prohibited zone 2. During operation, the fuel cell unit 3 only goes through permitted operating modes; however, mathematically, operating modes outside of the allowable range in accordance with FIG. 1 can also occur over an averaged time through phases with a switched-on and switched-off fuel cell unit 3.

Although particular embodiments of the present invention have been illustrated and described, it will be apparent to those skilled in the art that various changes and modifications can be made without departing from the spirit of the present invention. It is therefore intended to encompass within the appended claims all such changes and modifications that fall within the scope of the present invention.

What is claimed is:

1. A fuel cell system, comprising:
    a fuel cell unit having an anode side, a cathode side and an electrical output;
    an anode feeding line and outflow line for supplying of fuel and removing anode exhaust;
    a cathode feeding line and outflow line for supplying oxygen and removing cathode exhaust; and
    means for switching the fuel cell unit electrically between a switched-on mode in which electric power flows from said electrical output, and a switched-off mode in which no electric power flows from said electrical output, depending on an available quantity of fuel.

2. A fuel cell system as claimed in claim 1, further comprising a battery connected in parallel to the fuel cell unit.

3. A fuel cell system as claimed in claim 1, further comprising means for continually supplying at least one of fuel oxygen to the fuel cell unit during said switched-off mode.

4. A fuel cell system as claimed in claim 1, further comprising an intermediate storage device for the temporary storage of at least one of fuel and oxygen supplied to the fuel cell unit in said switched-off mode.

5. A fuel cell system as claimed in claim 1, further comprising a recirculating line to circulate fuel in said switched-off mode of the fuel cell unit.

6. A fuel cell system as claimed in claim 5, further comprising a pump in at least one of the recirculating line and in the anode feeding line.

7. A method for operating a fuel cell systems comprising:
    detecting an available quantity of at least one of an input fuel and an oxygen supply to said fuel cell system; and
    electrically switching a fuel cell unit between a switched-on mode in which electric power flows from said electrical output, and a switched-off mode in which no electric power flows from said electrical output, depending on said available quantity of at least one of fuel and oxygen.

8. A method as claimed in claim 7, further comprising:
    circulating at least one of the fuel or oxygen through a recirculating line in a switched-off mode of the fuel cell; and
    continually supplying fuel or oxygen to the fuel cell unit at least until, a set quantity of fuel is available on an anode side of the fuel cell system, or until a set quantity of oxygen is available at a cathode side of the fuel cell system.

9. A method as claimed in claim 7, wherein the fuel cell unit is switched on and/or off depending on the hydrogen pressure.

10. A method as claimed in claim 7, wherein the fuel cell unit is switched on and/or off depending on the hydrogen quantity in an outflow of the fuel cell unit.

11. A method as claimed in claim 7, further comprising adjusting the oxygen supply to the fuel cell unit depending on a switching mode of the fuel cell unit.

12. A method as claimed in claim 7, further comprising supplying power from a battery to components that use electric power when the fuel cell is in a switched-off mode.

13. A method as claimed in claim 12, further comprising detecting a charge state of the battery (8) and making additional power available for charging the battery from the fuel cell unit (3).

14. A method as claimed in claim 12, wherein, if the battery charging current drops below a minimum charging current, the fuel cell unit is switched off and/or the supply of the fuel cell unit with fuel and/or oxygen is discontinued.

15. A method as claimed in claim 7, wherein said switching step comprises a pulse-width modulated control of said means for the switching of the fuel cell unit, as a function of an anode-side fuel pressure.

16. A fuel cell system comprising:
    a fuel cell unit;
    a sensor for sensing a quantity of at least one of fuel and oxygen that is available for input to said fuel cell unit;
    a switch for switching said fuel cell between an on state in which it supplies an electric power output, and an off state in which it supplies no electric power output; and
    a control unit which controls operation of said switch between said on state and said off state, as a function of said quantity of available fuel or oxygen sensed by said sensor.

17. The method according to claim 8 wherein said set quantity of fuel or oxygen is a quantity that corresponds to a required power output of the fuel cell system.

* * * * *